(12) United States Patent
Patki et al.

(10) Patent No.: US 10,305,703 B1
(45) Date of Patent: May 28, 2019

(54) METHODS AND APPARATUS FOR CONTINUOUS TIME LINEAR EQUALIZER TUNING USING DECISION FEEDBACK EQUALIZER ADAPTATION ENGINE

(71) Applicant: INTEL CORPORATION, Santa Clara, CA (US)

(72) Inventors: Onkar Patki, Santa Clara, CA (US); Kenneth Taylor, Newark, CA (US); Nigel Gulstone, San Jose, CA (US)

(73) Assignee: Intel corporation, Santa Clara, CA (US)

( * ) Notice: Subject to any disclaimer, the term of this patent is extended or adjusted under 35 U.S.C. 154(b) by 0 days.

(21) Appl. No.: 15/390,216

(22) Filed: Dec. 23, 2016

(51) Int. Cl.
*H04L 5/00* (2006.01)
*H04L 25/03* (2006.01)
*H04L 7/00* (2006.01)

(52) U.S. Cl.
CPC ........ *H04L 25/03057* (2013.01); *H04L 5/006* (2013.01); *H04L 7/0058* (2013.01)

(58) Field of Classification Search
CPC ......... H04L 25/03057; H04L 25/03878; H04L 25/0298; H04L 25/03885; H04L 7/00; H04L 7/0079
See application file for complete search history.

(56) References Cited

U.S. PATENT DOCUMENTS

| | | | |
|---|---|---|---|
| 9,172,566 B1 * | 10/2015 | Li | H04L 25/03885 |
| 9,438,450 B1 * | 9/2016 | Kang | H04L 25/03885 |
| 2016/0218899 A1 | 7/2016 | Hoshyar et al. | |

* cited by examiner

*Primary Examiner* — Janice N Tieu
(74) *Attorney, Agent, or Firm* — Compass IP Law PC

(57) ABSTRACT

The presently-disclosed solution enables continuous time linear equalizer (CTLE) tuning without needing to perform bit error rate (BER) measurements. Because time consuming BER measurements are avoided, the CTLE tuning may be performed more rapidly as to reduce substantially the time required for link training. Furthermore, this solution re-uses decision feedback equalizer (DFE) adaptation circuitry so as to be highly efficient in its implementation. One embodiment relates to a method that tunes the CTLE based on results from the adaptation of the tap values of the DFE. Another embodiment relates to an apparatus that includes an interface for a control module to control a setting of a CTLE and an adaptation engine for a DFE. The value for the setting of the CTLE is selected using the adapted tap 1 value of the DFE as a figure of merit. Other embodiments and features are also disclosed.

19 Claims, 5 Drawing Sheets

METHODS AND APPARATUS FOR CONTINUOUS TIME LINEAR EQUALIZER TUNING USING DECISION FEEDBACK EQUALIZER ADAPTATION ENGINE

BACKGROUND

Technical Field

The present disclosure relates generally to transceivers and integrated circuits.

Description of the Background Art

As the signaling speeds used for communications between integrated circuits continue to increase, signal degradation during transmission becomes increasingly problematic. The signal degradation may cause inter-symbol interference and crosstalk which result in unwanted transmission errors and losses. Equalization may be employed to compensate for the signal degradation and to reduce the error rate to within specified limits.

SUMMARY

The presently-disclosed solution enables continuous time linear equalizer (CTLE) tuning without needing to perform bit error rate (BER) measurements. Because time consuming BER measurements are avoided, the CTLE tuning may be performed more rapidly as to reduce substantially the time required for link training. Furthermore, this solution re-uses decision feedback equalizer (DFE) adaptation circuitry so as to be highly efficient in its implementation.

One embodiment relates to a method that tunes the CTLE based on results from the adaptation of the tap values of the DFE. Another embodiment relates to an apparatus that includes an interface for a control module to control a setting of a CTLE and an adaptation engine for a DFE. The value for the setting of the CTLE is selected using the adapted tap 1 value of the DFE as a figure of merit.

Other embodiments and features are also disclosed.

DETAILED DESCRIPTION

Figure 1:
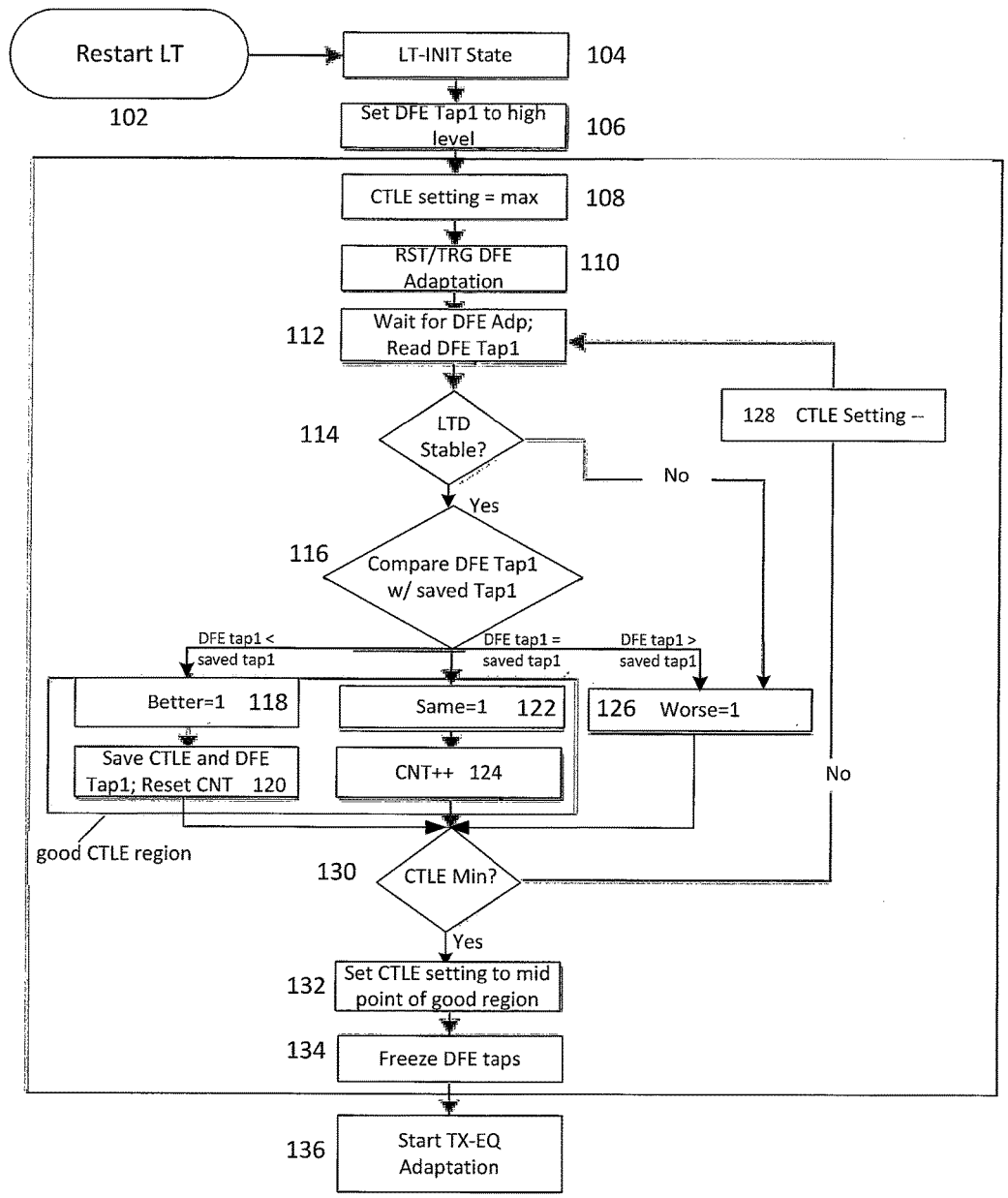
FIG. 1 is a flow chart of an exemplary method of tuning a continuous time linear equalizer (CTLE) in accordance with an embodiment of the invention.

FIG. 1 is a flow chart of an exemplary method 100 of tuning a continuous time linear equalizer (CTLE) in accordance with an embodiment of the invention. A CTLE is a linear analog equalizer and may be used in conjunction with a decision feedback equalizer (DFE) in a serial data receiver. The method 100 may be performed by a link training control module that controls and adapts serial data transceivers implemented on an integrated circuit.

Per step 102, the method 100 may begin upon triggering of a link training restart (Restart LT). For example, upon loss of a frame lock, a link training restart may be triggered. Per step 104, upon the link training restart, the link training control circuit module may enter a link training initialization (LT-INIT) state.

Per step 106, a saved value for tap 1 of the DFE may be set to a high number. The exact number is not important, only that it be sufficiently high so that it may be reduced during DFE adaptation. Per step 108, the CTLE setting that is to be tuned may be set to the maximum value that is allowed. In an exemplary implementation, the CTLE setting may be provided by a link training control module via a dynamic partial reconfigurable input/output (DPRIO).

Per step 110, a reset or triggering (RST/TRG) of DFE adaptation may occur. The DFE adaptation proceeds to adapt the DFE parameters (i.e., the DFE taps) to optimize the equalization while the CTLE setting remains fixed. A conventional procedure may be used for the DFE adaptation.

Per step 112, the link training control module may wait for the DFE adaptation to complete. Upon completion of the DFE adaptation (i.e. when the DFE tap values have converged to stable values), the value of the DFE tap 1 may be read. The readback of the value of DFE tap 1 may be done robustly by freezing the DFE tap values to ensure the readback value is stable and correct.

Per step 114, a determination is made as to whether the lock-to-data status (LTD) is stable for at least a predetermined period of time. The LTD status indicates that the clock-data recovery circuit for the receiver is locked on to the data signal. The period of time may be 1 millisecond, for example.

If the LTD is not stable for the period of time, then the equalization is clearly unsatisfactory and the current CTLE setting is undesirable. Hence, as depicted, the method 100 may move forward to step 126 and set a "worse" result flag to logical one (while a "better" result flag and a "same" result flag remain at logical zero). This indicates that the current CTLE setting is undesirable and effectively eliminates it from consideration. Thereafter, the method 100 moves forward to step 130.

On the other hand, if the LTD is stable for the period of time, then the link training control module goes to step 116. In step 116, the DFE tap 1 value that was read (i.e. the current DFE tap 1 value) is compared with the saved DFE tap 1 value.

If the current DFE tap 1 value (as the figure of merit) is less than the saved DFE tap 1 value, the method 100 goes to step 118 in which the "better" result flag associated with the current CTLE setting is set to logical one (while the "same" flag, the "worse" flag, and the "good" count may remain, or be reset to, logical zero). The "better" flag indicates that the current CTLE setting results in better equalization in comparison to the saved CTLE setting (due to the current DFE tap 1 being lower than the saved DFE tap 1). Hence, in step 120, the current CTLE setting is saved as the "latest better" CTLE setting, and the saved DFE tap 1 value is changed to be the current DFE tap 1 value since it is the lowest value so far. Thereafter, the method 100 moves forward to step 130.

If the current DFE tap 1 value (as the figure of merit being used) is equal to the saved DFE tap 1 value, the method 100 goes to step 122 in which the "same" flag associated with the current CTLE setting is set to logical one (while the "better" flag and the "worse" flag may remain, or be reset to, logical zero). The "same" flag indicates that the current CTLE setting results in a same quality of equalization compared the saved CTLE setting. Based on the "same" flag, a "good" count may be incremented by one per step 124 so as to keep track of the size of the "good" range (i.e. the range in CTLE settings that result so far in the lowest figure of merit). Thereafter, the method 100 moves forward to step 130.

Finally, if the current DFE tap 1 value is greater than the saved DFE tap 1 value, the method 100 goes to step 126 in which the "worse" flag is set to logical one (while the "better" flag and the "same" flag may remain, or be reset to, logical zero, and the "good" count remains as is). The "worse" flag indicates that the current CTLE setting results in worse equalization compared the saved CTLE setting. Thereafter, the method 100 moves forward to step 130.

In step 130, a determination may be a made as to whether the current CTLE setting is the minimum value allowed. If the current CTLE setting is not the minimum value allowed, then there are more CTLE settings to process. Hence, the method 100 goes to step 128 and decrements the CTLE setting by one to go to the next lower value. Thereafter, the method loops back to step 112 and again waits for the DFE adaptation to converge on stable values for the DFE taps, then continues on to step 114, and so on. On the other hand, if the current CTLE setting is the minimum value allowed, then the full range of CTLE settings have been processed, so the method 100 may move forward to step 132.

Per step 132, the method 100 uses the results of the above-discussed steps to determine the tuned CTLE. The results include the saved "latest better" CTLE setting and the "good" count. In an exemplary implementation, the saved "latest better" CTLE setting will not necessarily be used as the tuned CTLE setting. This is because there may be several adjacent CTLE settings that result in the same lowest DFE tap 1 value. In such a case, the method 100 may select a middle point of that range.

For example, the tuned CTLE setting may be set as follows. If the "good" count is zero or one, then the tuned CTLE setting may set to be the saved "latest better" CTLE setting. If the "good" count is two or three, then the tuned CTLE setting may set to be the saved "latest better" CTLE setting minus one. If the "good" count is four or five, then the tuned CTLE setting may set to be the saved "latest better" CTLE setting minus two. And so on.

Per step 134, with the CTLE being set to the tuned CTLE setting, the DFE adaptation may triggered once more to adapt the DFE taps to optimize the equalization. Upon completion of the DFE adaptation, the DFE tap values may be frozen. Thus, both the CTLE and DFE of the receiver is set to a tuned (adapted) condition.

Per step 136, with the receiver equalizer tuned, the adaptation of the transmitter equalizer may be started. Adaptation of the transmitter equalizer may be accomplished with conventional procedures.

Note that the exemplary method 100 described above in relation to FIG. 1 goes across the range of CTLE settings from high to low. However, an alternative implementation may go across the range of CTLE settings from low to high.

Figure 2:
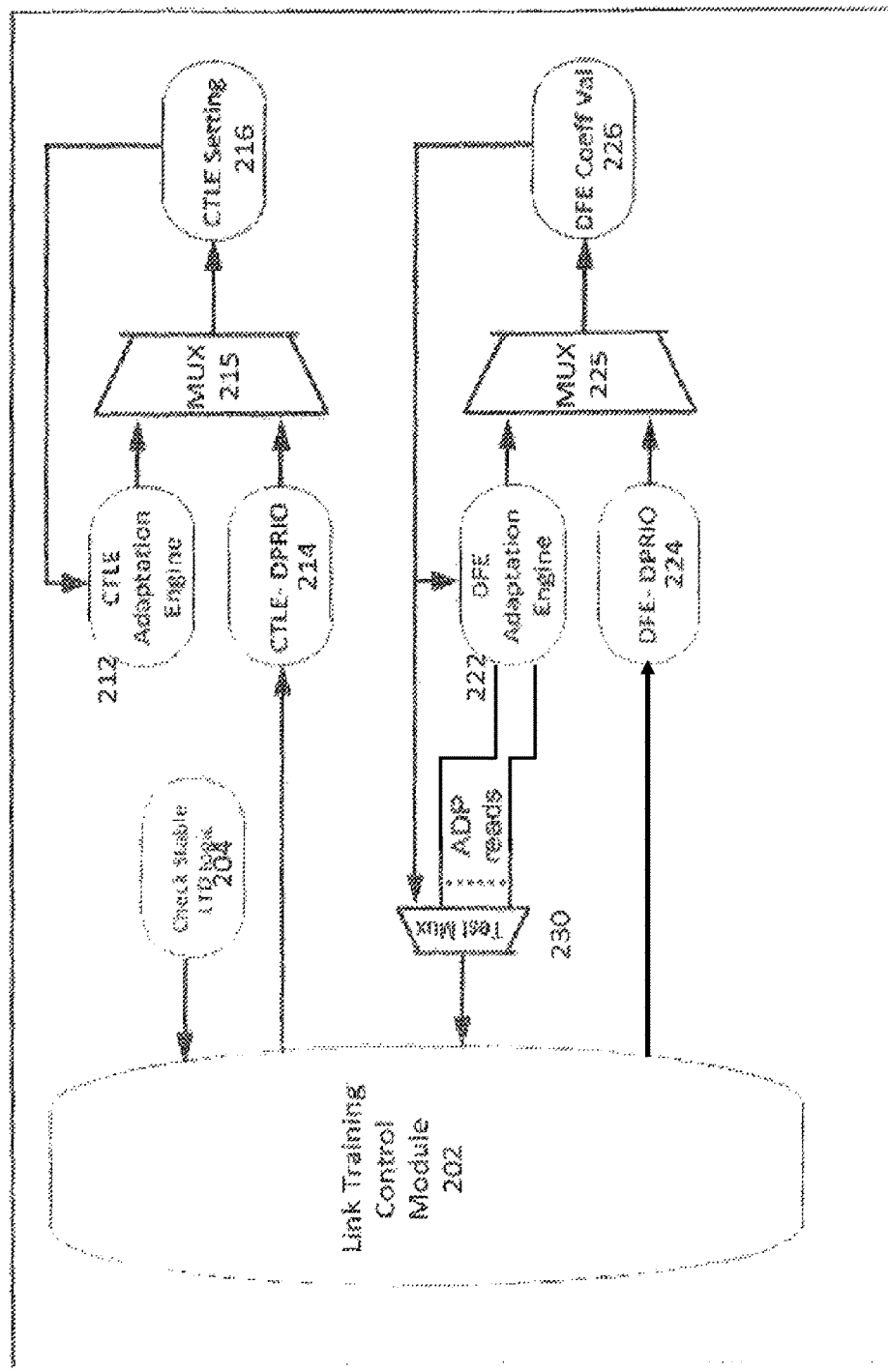
FIG. 2 is a schematic diagram of exemplary apparatus for tuning a CTLE in accordance with an embodiment of the invention.

FIG. 2 is a schematic diagram of exemplary apparatus 200 for tuning a CTLE in accordance with an embodiment of the invention. The exemplary apparatus 200 may use the method 100 described above to select optimal CTLE settings for a link. The link may be, for example, a 10 BASE-KR Ethernet Backplane link or may be another type of link.

As depicted, the apparatus 200 may include a link training control module 202, a CTLE adaptation engine module 212, and a DFE adaptation engine module 222, each of which may be implemented with hard and/or programmable logic circuitry or using an embedded microcontroller. In accordance with an embodiment of the invention, these modules may be programmed or configured to perform the method 100 described above. As shown, the link training control module 202 may receive a lock-to-data (LTD) signal 204 from LTD logic of the transceiver that enables the link training control module 202 to check for a stable lock-to-data.

As further shown, the link training control module 202 may use a first dynamic partial reconfigurable input/output (CTLE-DPRIO) interface 214 to provide write control to the CTLE setting 216. Similarly, the link training control module 202 may use a second dynamic partial reconfigurable input/output (DFE-DPRIO) interface 224 to provide write control to the DFE tap settings (DFE coefficient values) 226.

A first multiplexer 215 may be used by the link training control module 202 to controllably select either the CTLE setting generated by the CTLE adaptation engine module 212 or the CTLE setting provided by the link training control module 202 via the CTLE-DPRIO interface 214. In this exemplary apparatus 200, the first multiplexer 215 may be controlled to select the CTLE setting provided by the link training control module 202 via the CTLE-DPRIO interface 214, instead of that provided by the "native" CTLE adaptation engine module 212. This is desirable when the presently-disclosed method 100 for tuning the CTLE setting 216 is more effective than the method provided by the CTLE adaptation engine module 212.

Similarly, a second multiplexer 225 may be used by the link training control module 202 to controllably select either the DFE coefficient values generated by the DFE adaptation engine module 222 or the DFE coefficient values provided by the link training control module 202 via the DFE-DPRIO interface 224. For step 106 in the method 100, the DFE tap 1 value may be set to a high number by the link training control module 202 via the DFE-DPRIO interface 224. On the other hand, for step 112 in the method 100, the DFE tap values may be set by the DFE adaptation engine module 222.

A test multiplexer (Test Mux) 230 may be used by the link training control module 202 to read the DFE coefficient values 226 being used by the DFE and also to read the DFE coefficient values (ADP) generated by the DFE adaptation engine module 222. In particular, as described above in relation to FIG. 1, the DFE tap 1 value generated by the DFE adaptation engine module 222 is read and used as a figure of merit in tuning the CTLE setting 216 by the link training control module 202.

Figure 3A:
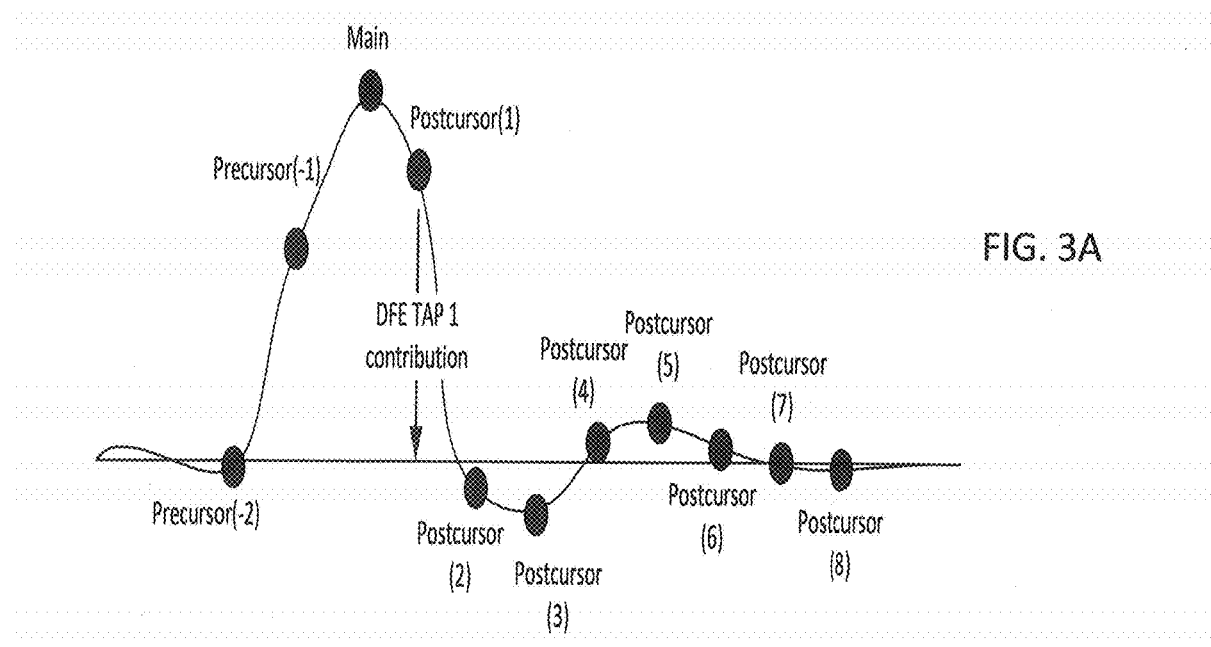
FIGS. 3A and 3B depicts an impulse response, respectively, before and after CTLE tuning in accordance with an embodiment of the invention.
Figure 3B:
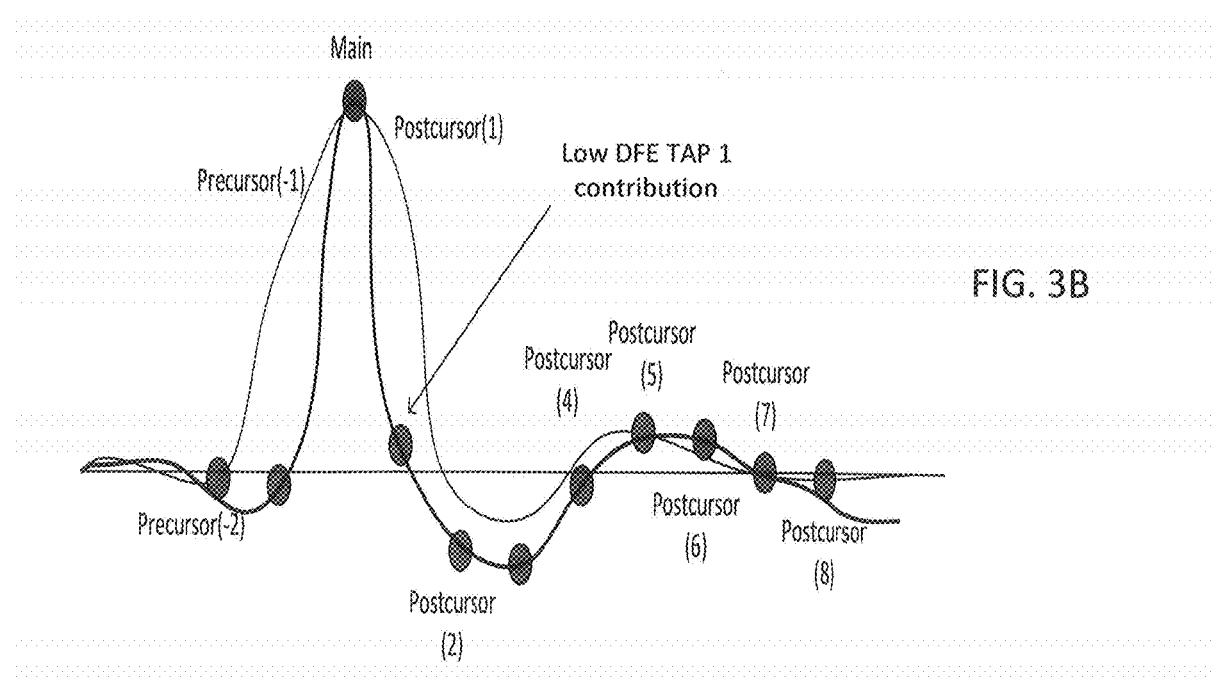

FIGS. 3A and 3B depicts an impulse response, respectively, before and after CTLE tuning in accordance with an embodiment of the invention. The Postcursor(1) value depicted corresponds to the DFE tap 1 value. This Postcursor(1) value is substantially reduced after CTLE tuning as shown in FIG. 3B in comparison with before CTLE tuning as shown in FIG. 3A.

Table 1 below shows an example of the presently-disclosed solution as used to tune a CTLE of a receiver with DFE adaptation. In this example, the CTLE setting (output by the CTLE-DPRIO) may be tuned to setting number 23 which is at a middle of the range of settings which results in a zero value for DFE Tap 1.

TABLE 1

| CTLE setting | DFE Tap 1 |
| --- | --- |
| 3 | 34 |
| 4 | 32 |
| 5 | 30 |
| 6 | 30 |
| 7 | 29 |
| 8 | 26 |
| 9 | 23 |
| 10 | 22 |
| 11 | 19 |
| 12 | 18 |
| 13 | 16 |
| 14 | 11 |
| 15 | 7 |
| 16 | 3 |
| 17 | 0 |
| 18 | 0 |
| 19 | 0 |
| 20 | 0 |
| 21 | 0 |
| 22 | 0 |
| 23 | 0 |
| 24 | 0 |
| 25 | 0 |
| 26 | 0 |
| 27 | 0 |
| 28 | 0 |
| 29 | 0 |
| 30 | 0 |

Exemplary Field Programmable Gate Array and Electronic System

Figure 4:
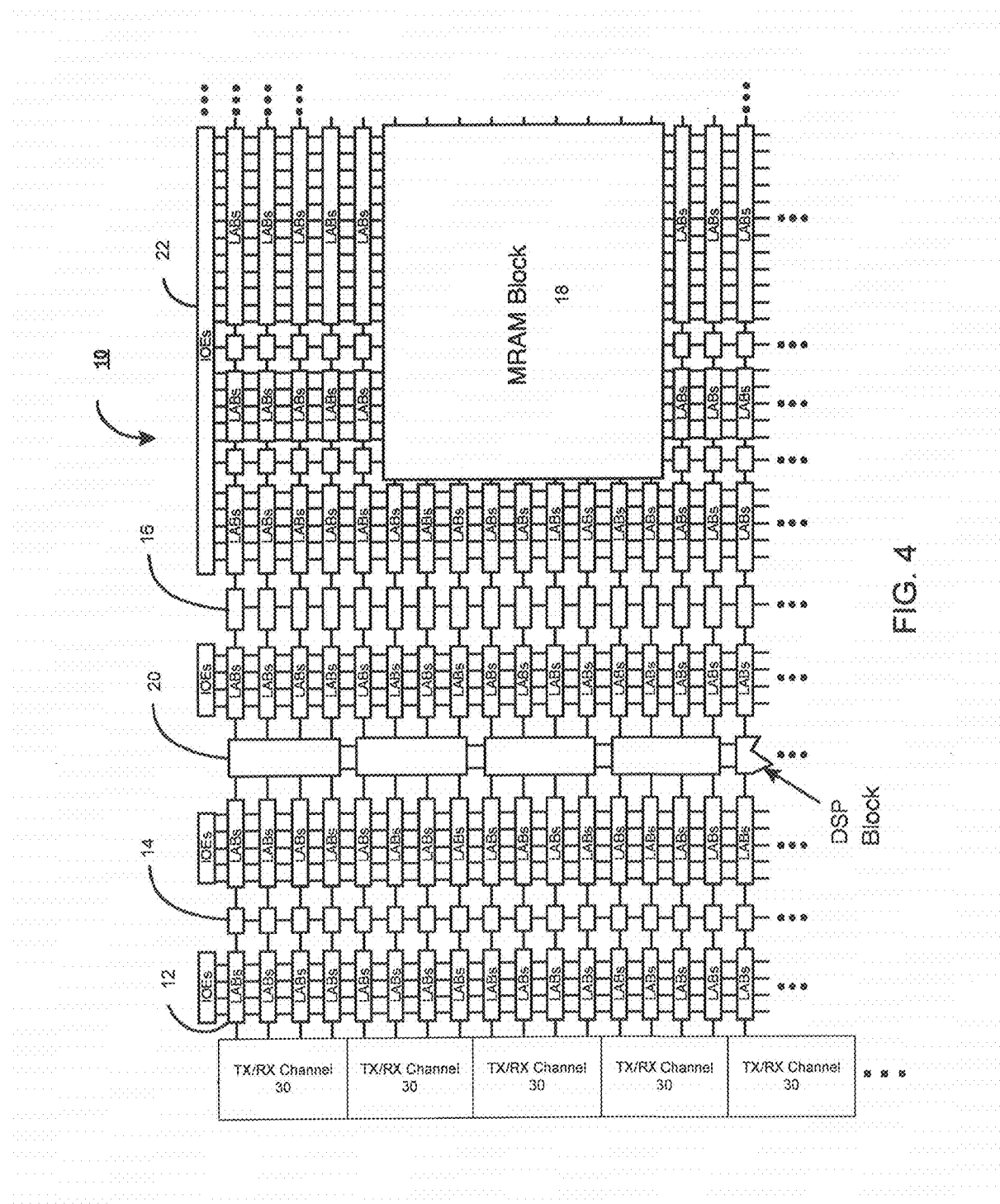
FIG. 4 is an exemplary simplified partial block diagram of a field programmable gate array (FPGA) that may be configured to implement an embodiment of the present invention.

FIG. 4 is a simplified partial block diagram of a field programmable gate array (FPGA) 10 that may be arranged to include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs.

It is to be understood that FPGA 10 is described herein for illustrative purposes only and that the present invention can be implemented in many different types of PLDs, FPGAs, and ASICs.

Figure 5:
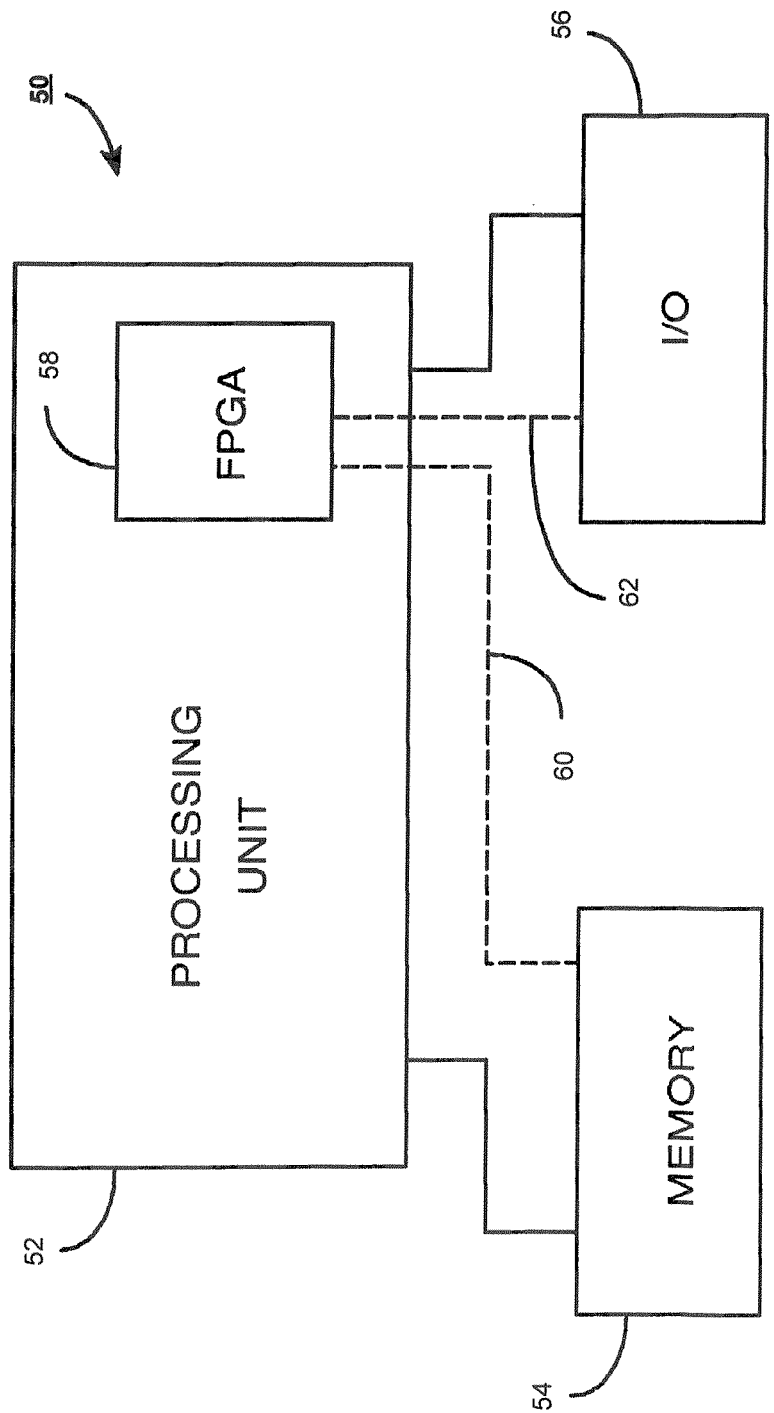
FIG. 5 shows a block diagram of an exemplary digital system that may be configured to utilize an embodiment of the present invention.

FIG. 5 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of tuning a continuous-time linear equalizer, the method comprising:
   providing a series of test values for a setting of the continuous-time linear equalizer;
   for each of the test values, triggering an adaptation of tap values of a decision feedback equalizer; and
   determining a tuned value for the setting of the continuous-time linear equalizer based on results from the adaptation of the tap values of the decision feedback equalizer.

2. The method of claim 1, wherein the series of test values spans an allowed range of the setting of the continuous-time linear equalizer.

3. The method of claim 1, further comprising:
   for each of the test values, waiting for completion of the adaptation of the tap values of the decision feedback equalizer.

4. The method of claim 1, further comprising:
   using an adapted tap 1 value of the decision feedback equalizer as a figure of merit for determining the tuned value for the setting of the continuous-time linear equalizer.

5. The method of claim 4, wherein a region of values for the setting of the continuous-time linear equalizer results in a lowest adapted tap 1 value of the decision feedback equalizer, and wherein the tuned value for the setting of the continuous-time linear equalizer is selected at a midpoint of the region.

6. An apparatus that trains a receiver of a serial link, the apparatus comprising:
   a transceiver including a transmitter and a receiver for providing a serial link to another integrated circuit;
   a continuous-time linear equalizer and a decision feedback equalizer for equalizing a data signal received via the serial link by the receiver;
   a control module that controls the training of the receiver of the serial link;
   an interface for the control module to control a setting of a continuous-time linear equalizer of the receiver;
   an adaptation engine for a decision feedback equalizer of the receiver; and
a circuit for the control module to read tap values determined by the adaptation engine for the decision feedback equalizer, wherein the value for the setting of the continuous-time linear equalizer is selected using at least one of the tap values determined by the adaptation engine for the decision feedback equalizer.

7. The apparatus of claim 6, wherein the at least one of the tap values comprises a tap 1 value.

8. The apparatus of claim 6, wherein the control module uses the interface to provide a series of test values for a setting of the continuous-time linear equalizer.

9. The apparatus of claim 8, wherein, for each of the test values, the control module triggers the adaptation engine to adapt the tap values of the decision feedback equalizer.

10. The apparatus of claim 9, wherein, for each of the test values, control module waits for completion of the adaptation of the tap values by the adaptation engine.

11. The apparatus of claim 9, wherein the series of test values spans an allowed range of the setting of the continuous-time linear equalizer.

12. The apparatus of claim 11, wherein a region of values for the setting of the continuous-time linear equalizer results in a lowest adapted tap 1 value of the decision feedback equalizer, and wherein the tuned value for the setting of the continuous-time linear equalizer is selected at a midpoint of the region.

13. An integrated circuit comprising:
   a transceiver including a transmitter and a receiver for providing a serial link to another integrated circuit;
   a continuous-time linear equalizer and a decision feedback equalizer for equalizing a data signal received via the serial link by the receiver;
   a control module that controls training of the serial link;
   an interface for the control module to control a setting of the continuous-time linear equalizer;
   an adaptation engine for the decision feedback equalizer; and
   a circuit for the control module to read tap values determined by the adaptation engine for the decision feedback equalizer, wherein the value for the setting of the continuous-time linear equalizer is selected using at least one of the tap values determined by the adaptation engine for the decision feedback equalizer.

14. The integrated circuit of claim 13, wherein the at least one of the tap values comprises a tap 1 value.

15. The integrated circuit of claim 13, wherein the control module uses the interface to provide a series of test values for a setting of the continuous-time linear equalizer.

16. The integrated circuit of claim 15, wherein, for each of the test values, the control module triggers the adaptation engine to adapt the tap values of the decision feedback equalizer.

17. The integrated circuit of claim 16, wherein, for each of the test values, control module waits for completion of the adaptation of the tap values by the adaptation engine.

18. The integrated circuit of claim 16, wherein the series of test values spans an allowed range of the setting of the continuous-time linear equalizer.

19. The integrated circuit of claim 18, wherein a region of values for the setting of the continuous-time linear equalizer results in a lowest adapted tap 1 value of the decision feedback equalizer, and wherein the tuned value for the setting of the continuous-time linear equalizer is selected at a midpoint of the region.

* * * * *